US009423637B2

(12) United States Patent
Saitoh et al.

(10) Patent No.: US 9,423,637 B2
(45) Date of Patent: Aug. 23, 2016

(54) DISPLAY DEVICE INCLUDING DATA SIGNAL LINE DRIVE CIRCUIT

(75) Inventors: Kohji Saitoh, Osaka (JP); Masaki Uehata, Osaka (JP); Masami Ozaki, Osaka (JP); Toshihiro Yanagi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 176 days.

(21) Appl. No.: 14/113,403

(22) PCT Filed: Apr. 23, 2012

(86) PCT No.: PCT/JP2012/060889
§ 371 (c)(1),
(2), (4) Date: Oct. 23, 2013

(87) PCT Pub. No.: WO2012/147701
PCT Pub. Date: Nov. 1, 2012

(65) Prior Publication Data
US 2014/0055697 A1  Feb. 27, 2014

(30) Foreign Application Priority Data

Apr. 28, 2011 (JP) ................................. 2011-102378

(51) Int. Cl.
G06F 3/038 (2013.01)
G02F 1/133 (2006.01)
G09G 3/36 (2006.01)

(52) U.S. Cl.
CPC ......... *G02F 1/13306* (2013.01); *G09G 3/3688* (2013.01); *G09G 3/3614* (2013.01); *G09G 3/3696* (2013.01); *G09G 2310/0291* (2013.01)

(58) Field of Classification Search
CPC ............ G09G 3/18; G09G 3/30; G09G 3/36; G09G 5/00; G06F 3/038; G02F 1/141
USPC ....................................................... 345/100
See application file for complete search history.

(56) References Cited

U.S. PATENT DOCUMENTS 6,049,321 A    4/2000 Sasaki
2002/0180673 A1  12/2002 Tsuda et al.
(Continued)

FOREIGN PATENT DOCUMENTS

JP  10-153986 A   6/1998
JP  2001-312253 A  11/2001
(Continued)

OTHER PUBLICATIONS

Official Communication issued in International Patent Application No. PCT/JP2012/060889, mailed on Jul. 17, 2012.

*Primary Examiner* — Pegeman Karimi
(74) *Attorney, Agent, or Firm* — Keating & Bennett, LLP

(57) ABSTRACT

A source AMP output circuit (10) is provided with a switching circuit (17) for carrying out the following operation. That is, in a case where a polarity is reversed, the switching circuit (17) disconnects a data signal line (S(M)) from output terminals of a positive amplifier circuit (15) and a negative polarity amplifier circuit (16) each included in the source AMP output circuit (10), and then connects the data signal line S(M) to a power supply which is in a power supply voltage range (Vdd1 to Vdd3) of the positive polarity amplifier circuit (15) or to a power supply which is in a power supply voltage range (Vdd2 to Vdd4) of the negative polarity amplifier circuit (16).

20 Claims, 11 Drawing Sheets

(56) References Cited

U.S. PATENT DOCUMENTS

| | | | |
|---|---|---|---|
| 2005/0206629 A1* | 9/2005 | Tseng | G09G 3/3688 345/204 |
| 2007/0290979 A1* | 12/2007 | Lee et al. | 345/100 |
| 2008/0174462 A1 | 7/2008 | Tsuchi | |

FOREIGN PATENT DOCUMENTS

| | | |
|---|---|---|
| JP | 2003-315768 A | 11/2003 |
| JP | 2008-116654 A | 5/2008 |

* cited by examiner

DISPLAY DEVICE INCLUDING DATA SIGNAL LINE DRIVE CIRCUIT

TECHNICAL FIELD

The present invention relates to a display device which consumes less electric power.

BACKGROUND ART

In recent years, portable devices that are provided with display devices and use a limited electric power source like a battery, such as a smart phone, a mobile phone, and a portable television, have been developed, and display devices mainly used indoors, such as a TV and a monitor, have grown in size. Accordingly, many attempts have been made in order that electric power consumption is reduced in such display devices.

For example, according to a conventional technique, a data signal line drive circuit of a liquid crystal display device is configured such that 0V (GND) is supplied as a low power supply voltage, Vdd is supplied as high power supply voltage, and an amplifier circuit 100 whose input and output ranges are each from 0V to Vdd is provided for each data signal line S(m) (see (a) of FIG. 7).

In a case where the liquid crystal display device carries out reverse polarity driving such as dot inversion driving, line inversion driving, or frame inversion driving, the amplifier circuit 100 in the data signal line drive circuit is supplied with data signals of positive polarity and negative polarity. Thus, the amplifier circuit 100 needs to have a high withstand voltage, whereby the amplifier circuit 100 has a problem of electric power consumption.

In order to deal with this, the data signal line drive circuit may be configured such that, as the amplifier circuit, a positive polarity amplifier circuit 15 and a negative polarity amplifier circuit 16 are provided for each data signal line S(m) (see (b) of FIG. 7).

In the configuration of (b) of FIG. 7, the positive polarity amplifier circuit 15 is supplied with Vdd1 having a positive value, as the high power supply voltage, and is supplied with 0V (GND) as the low power supply voltage. Thus, the positive polarity amplifier circuit 15 has an output range of 0V (GND) to Vdd1.

On the other hand, the negative polarity amplifier circuit 16 is supplied with 0V (GND) as the high power supply voltage, and is supplied with Vdd2 having a negative value, as the low power supply voltage. Thus, the negative polarity amplifier circuit 16 has an output range of Vdd2 to 0V (GND).

Further, in the configuration of (b) of FIG. 7, an absolute value of a difference between Vdd1 and Vdd2 is set to be equal to an absolute value of a difference between Vdd and GND so that the output range becomes equal to that of the amplifier circuit 100 shown in (a) of FIG. 7. As a result, each of the positive polarity amplifier circuit 15 and the negative polarity amplifier circuit 16 has a considerably lower withstand voltage than that of the amplifier circuit 100 shown in (a) of FIG. 7.

Therefore, with an amplifier circuit configuration as those shown in (b) of FIG. 7, it is possible to provide a liquid crystal display device which consumes less electric power.

CITATION LIST

Patent Literature

Patent Literature 1
Japanese Patent Application Publication, Tokukai No. 2001-312253 A (Publication Date: Nov. 9, 2001)

SUMMARY OF INVENTION

Technical Problem

However, in a case where a display device, e.g., a liquid crystal display device carries out the reverse polarity driving such as the dot inversion driving, the line inversion driving, or the frame inversion driving, the amplifier circuit configuration as those shown in (b) of FIG. 7 operates as follows. That is, in response to a polarity inversion signal, a data signal that is to be supplied to the data signal line S(m) via one of the positive polarity amplifier circuit 15 and the negative polarity amplifier circuit 16 is changed to be outputted to the data signal line S(m) via the other of the positive polarity amplifier circuit 15 and the negative polarity amplifier circuit 16.

The positive polarity amplifier circuit 15 has a withstand voltage range of 0V to Vdd1, whereas the negative polarity amplifier circuit 16 has a withstand voltage range of Vdd2 to 0V. As such, the positive polarity amplifier circuit and the negative polarity amplifier circuit 16 are completely different from each other in the withstand voltage range.

According to such a configuration, in a case where the data signal line S(m) is electrically connected to the negative polarity amplifier circuit 16 so as to be supplied with a data signal with the output range of Vdd2 to 0V from the negative polarity amplifier circuit 16 and thereafter the data signal line S(m) is electrically connected to the positive polarity amplifier circuit 15 in response to a polarity inversion signal, the data signal with the output range of Vdd2 to 0V thus supplied to the data signal line S(m) is supplied to the positive polarity amplifier circuit 15 having a withstand voltage range of 0V to Vdd1. As a result, the positive polarity amplifier circuit 15 may be damaged (see (b) of FIG. 7).

Similarly, in a case where the data signal lines S(m) is electrically connected to the positive polarity amplifier circuit 15 so as to be supplied with a data signal with the output range of 0V to Vdd1 from the positive polarity amplifier circuit 15 and thereafter the data signal lines S(m) is electrically connected to the negative polarity amplifier circuit 16 in response to a polarity inversion signal, the data signal with the output range of 0V to Vdd1 thus supplied to the data signal line S(m) is supplied to the negative polarity amplifier circuit 16. As a result, the negative amplifier circuit 16 may be damaged.

As described above, use of the amplifier circuit configuration shown in (b) of FIG. 7 makes it possible to provide the liquid crystal display device which consumes less electric power. However, the amplifier circuit configuration shown in (b) of FIG. 7 involves a risk of a damage of the amplifier circuit, so as to have a problem in reliability.

The present invention has been made in view of the problems, and an object of the present invention is to provide a display device which consumes less electric power and secures reliability.

Solution to Problem

In order to attain the object, a display device of the present invention includes: a data signal line drive circuit; and a plurality of data signal lines connected to the data signal line drive circuit, said data signal line drive circuit including: a positive polarity amplifier circuit provided for each of the plurality of data signal lines; a negative polarity amplifier circuit provided for said each of the plurality of data signal lines; and a switching circuit provided for said each of the plurality of data signal lines, in a case where a data signal supplied to a corresponding one of the plurality of data signal lines via one of the positive polarity amplifier circuit and the negative polarity amplifier circuit is changed to be supplied to the corresponding one of the plurality of data signal lines via the other of the positive polarity amplifier circuit and the negative polarity amplifier circuit, the switching circuit (i) electrically disconnecting the corresponding one of the plurality of data signal lines from the positive polarity amplifier circuit and the negative polarity amplifier circuit and (ii) connecting, for a given period, the corresponding one of the plurality of data signal lines to a node which is in a power supply voltage range of the other of the positive polarity amplifier circuit and the negative polarity amplifier circuit.

According to the configuration, in a case where the data signal supplied to the corresponding one of the plurality of data signal lines via the one of the positive polarity amplifier circuit and the negative polarity amplifier circuit is changed to be supplied to the corresponding one of the plurality of data signal lines via the other of the positive polarity amplifier circuit and the negative polarity amplifier circuit, the switching circuit electrically disconnects the corresponding one of the plurality of data signal lines from the positive polarity amplifier circuit and the negative polarity amplifier circuit, and then makes a potential level of the corresponding one of the plurality of data signal lines closer to a potential level which is in the power supply voltage range of the other of the positive polarity amplifier circuit and the negative polarity amplifier circuit. Thereafter, the switching circuit electrically connects the corresponding one of the plurality of data signal lines to the other of the positive polarity amplifier circuit and the negative polarity amplifier circuit. This makes it possible to prevent a damage of the positive polarity amplifier circuit and the negative polarity amplifier circuit.

Furthermore, the switching circuit operates only at a timing when the data signal supplied to the corresponding one of the plurality of data signal lines via the one of the positive polarity amplifier circuit and the negative polarity amplifier circuit is changed to be supplied to the corresponding one of the plurality of data signal lines via the other of the positive polarity amplifier circuit and the negative polarity amplifier circuit. In a case where no such the change occurs at transition of a horizontal period or a vertical period, the switching circuit does not operate. This makes it possible to prevent an increase in electric power consumption caused by unnecessary transmission of electric charge.

Therefore, according to the above configuration, it is possible to provide a display device which consumes less electric power and secures reliability.

Advantageous Effects of Invention

As described above, the display device of the present invention is configured to include a data signal line drive circuit; and a plurality of data signal lines connected to the data signal line drive circuit, said data signal line drive circuit including: a positive polarity amplifier circuit provided for each of the plurality of data signal lines; a negative polarity amplifier circuit provided for said each of the plurality of data signal lines; and a switching circuit provided for said each of the plurality of data signal lines, in a case where a data signal supplied to a corresponding one of the plurality of data signal lines via one of the positive polarity amplifier circuit and the negative polarity amplifier circuit is changed to be supplied to the corresponding one of the plurality of data signal lines via the other of the positive polarity amplifier circuit and the negative polarity amplifier circuit, the switching circuit (i) electrically disconnecting the corresponding one of the plurality of data signal lines from the positive polarity amplifier circuit and the negative polarity amplifier circuit and (ii) connecting, for a given period, the corresponding one of the plurality of data signal lines to a node which is in a power supply voltage range of the other of the positive polarity amplifier circuit and the negative polarity amplifier circuit.

Therefore, it is possible to provide a display device which consumes less electric power and secures reliability.

Figure 4:
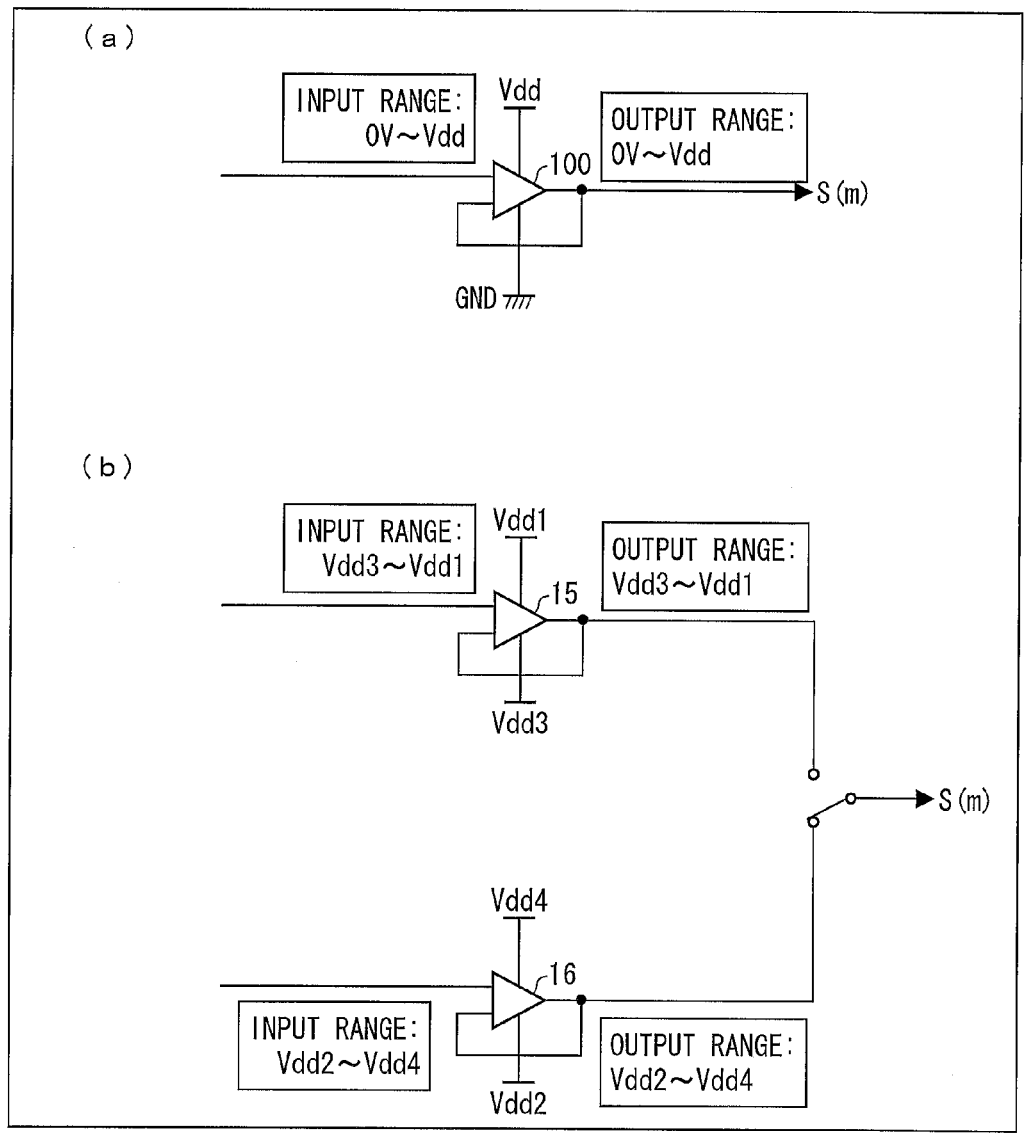

(a) of FIG. 4 illustrates a configuration of a conventional amplifier circuit. (b) of FIG. 4 illustrates a configuration of an amplifier circuit employed in the liquid crystal display device of the embodiment of the present invention.

Figure 5:
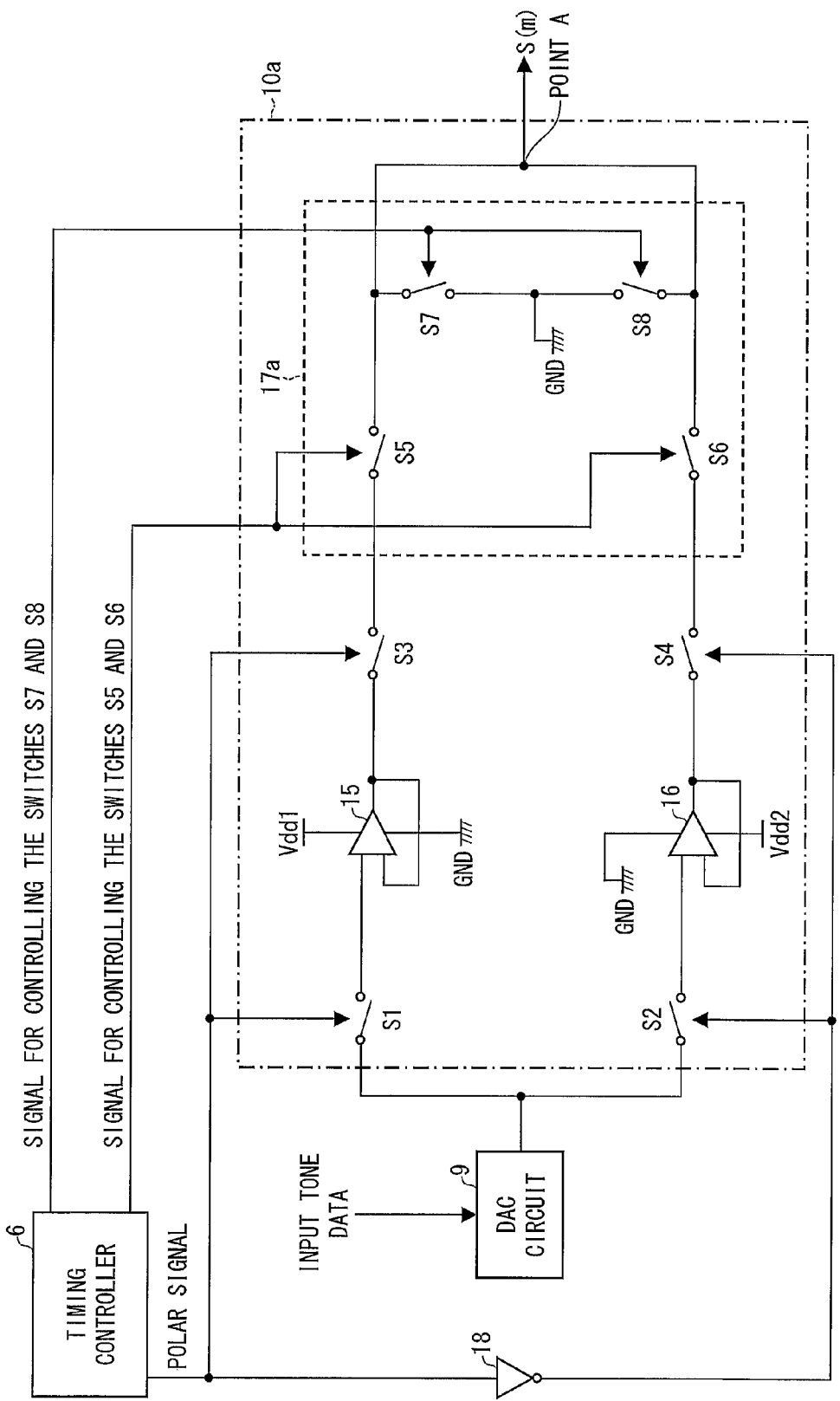

FIG. 5 illustrates a circuit configuration of a source AMP output circuit including another switching circuit which is applicable to the liquid crystal display device of the embodiment of the present invention.

Figure 6:
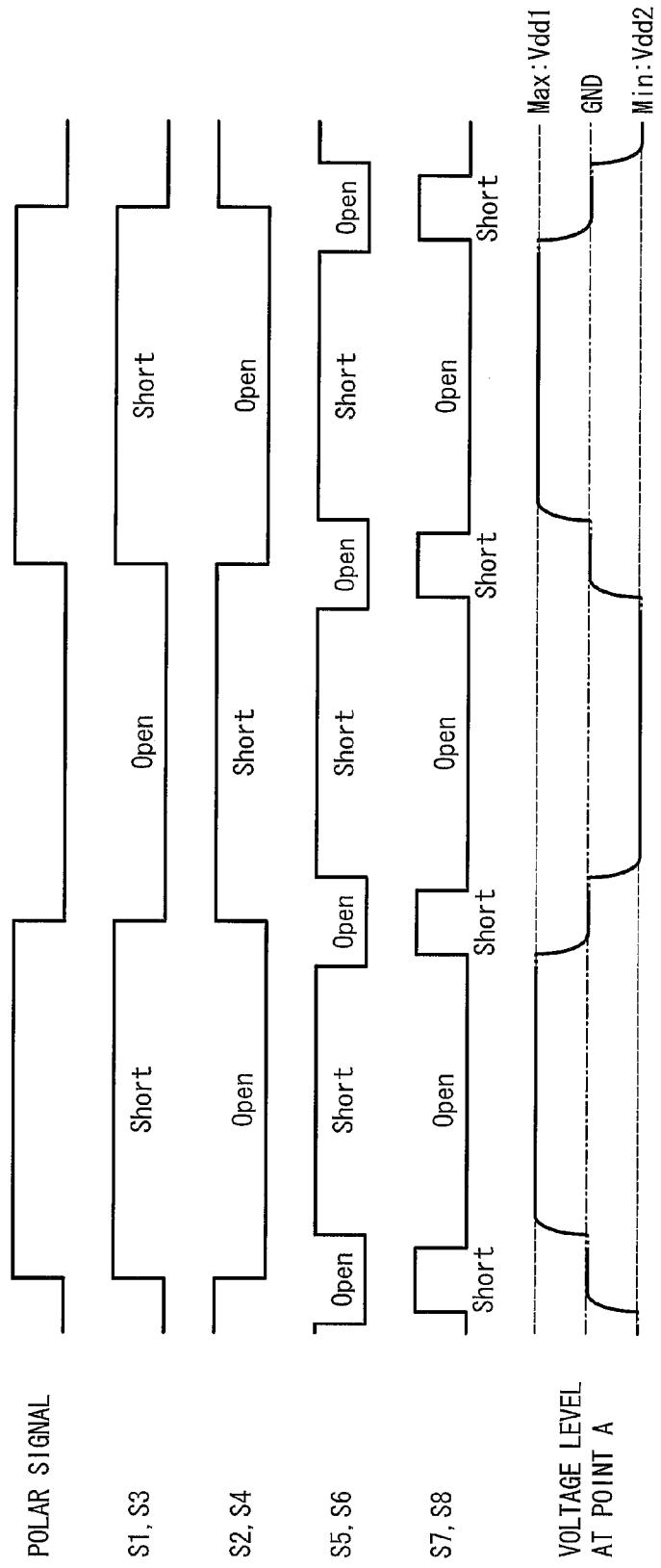

FIG. 6 illustrates a timing chart of how the source AMP output circuit shown in FIG. 5 is driven.

Figure 7:
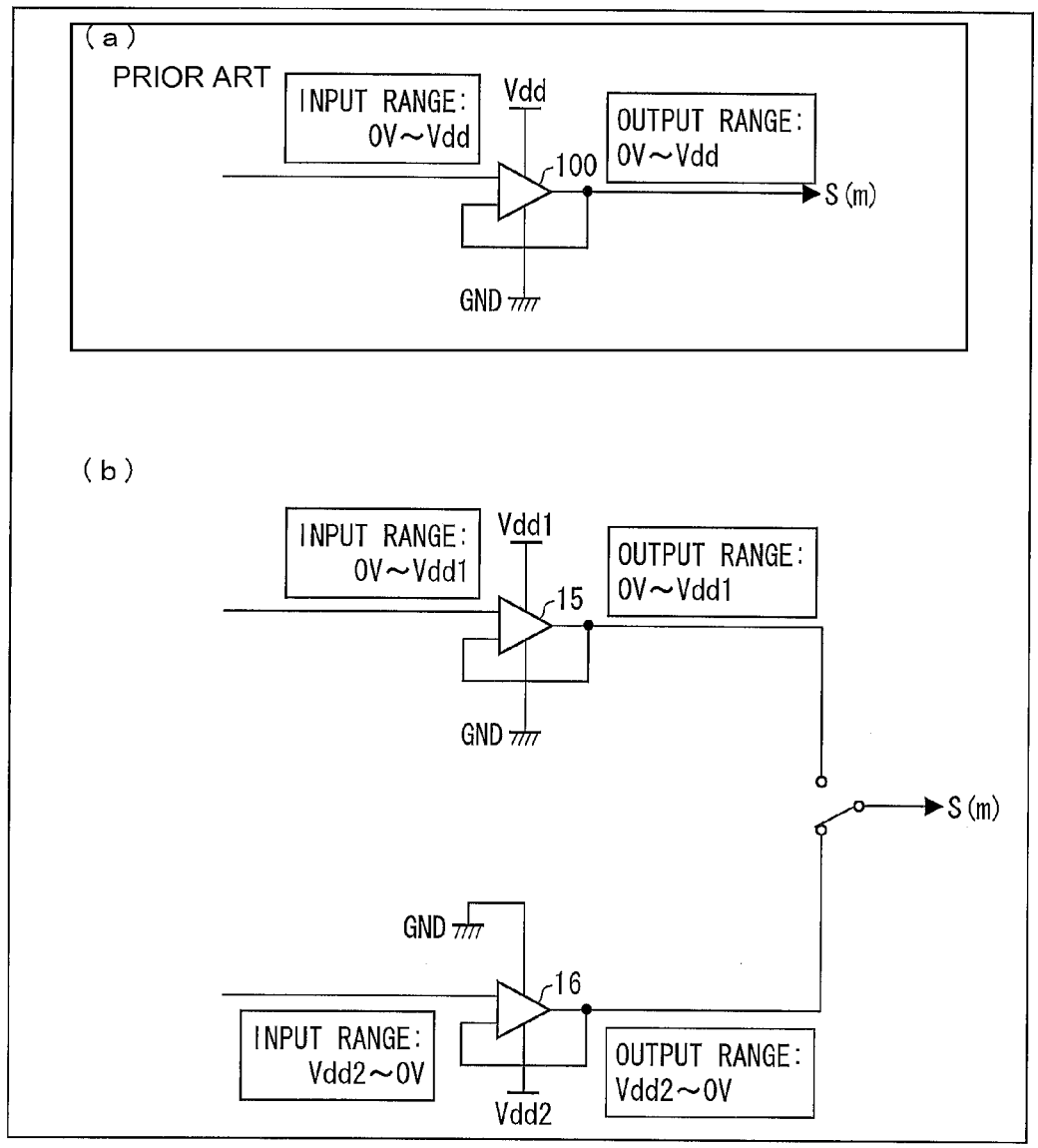

(a) of FIG. 7 illustrates a configuration of a conventional amplifier circuit. (b) of FIG. 7 illustrates a configuration of an amplifier circuit employed in the source AMP output circuit shown in FIG. 5.

Figure 8:
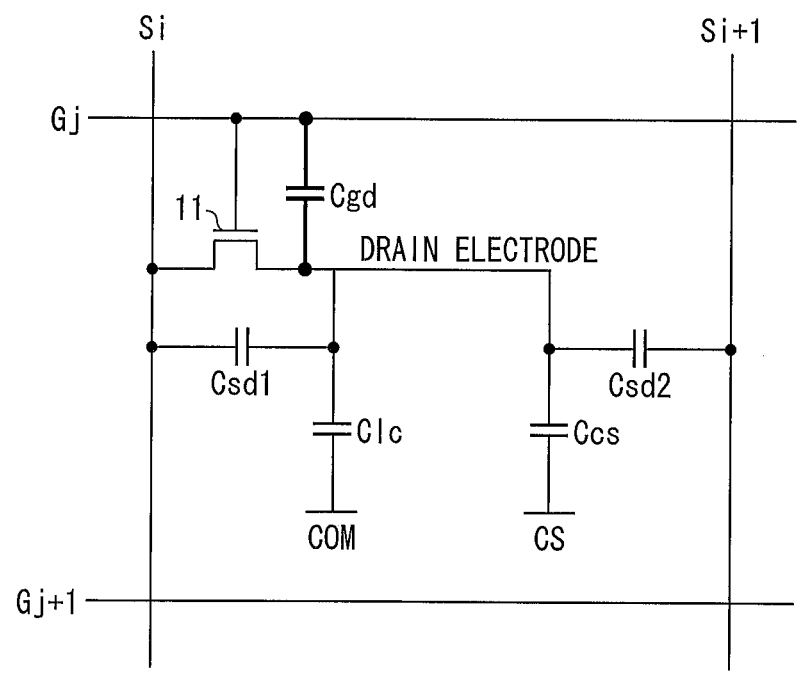

FIG. 8 illustrates feed-through of a drain potential by Cgd.

Figure 9:
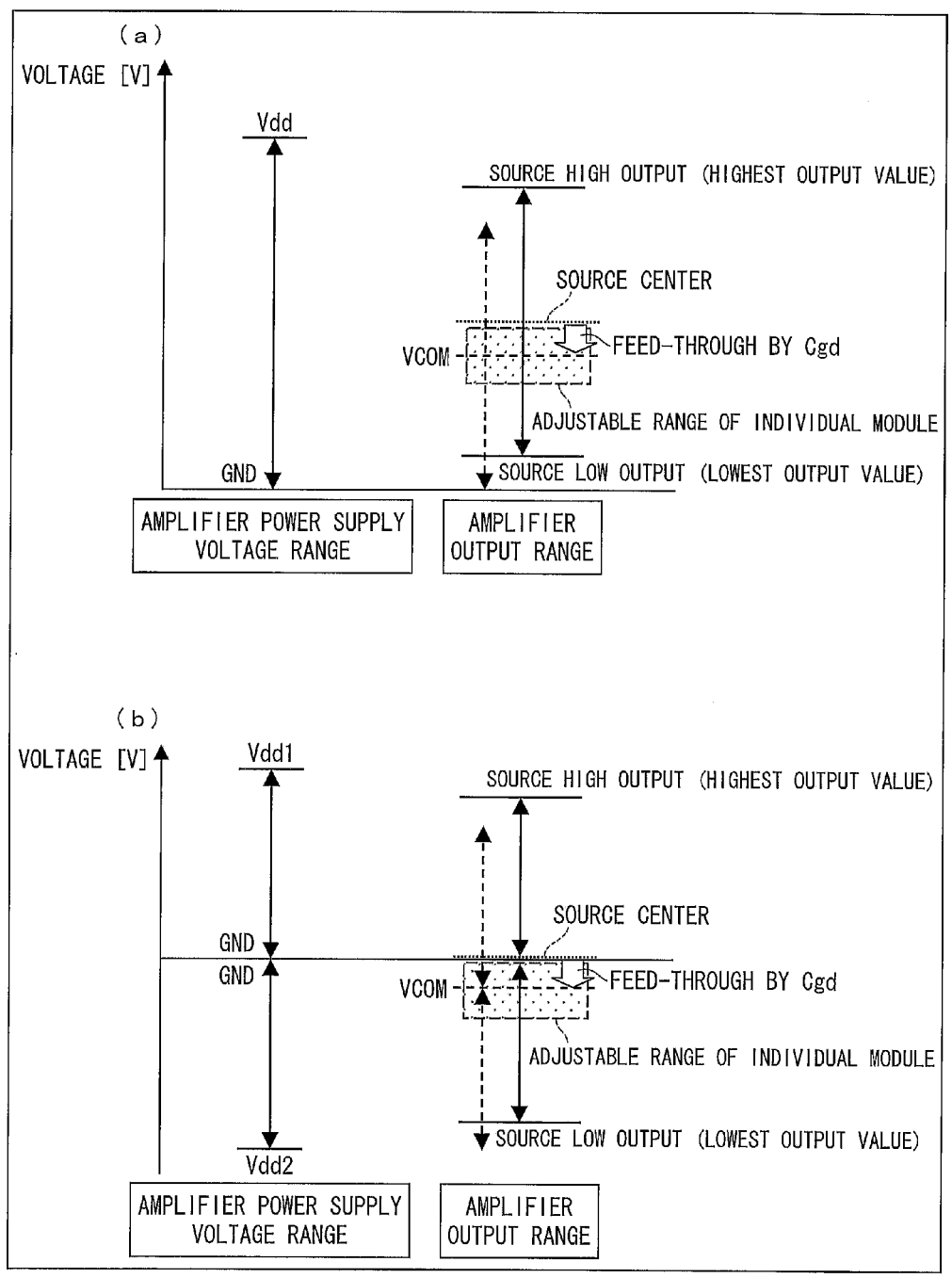

(a) of FIG. 9 shows an amplifier power supply voltage range and an amplifier output range each applied to a conventional liquid crystal display device. (b) of FIG. 9 shows an amplifier power supply voltage range and an amplifier output range each applicable to a configuration including positive and negative voltage supplies.

Figure 10:
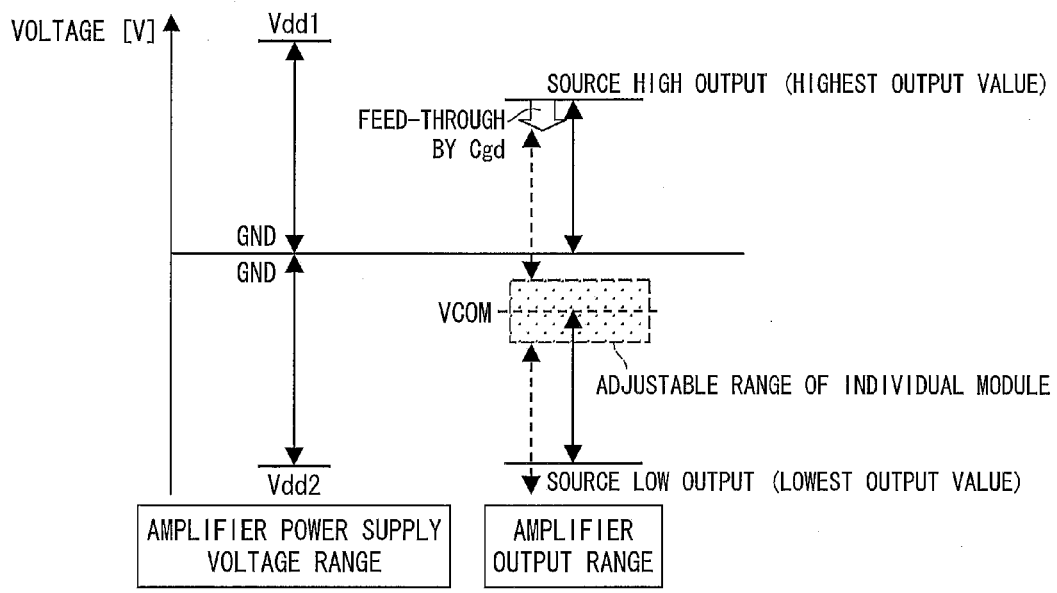

FIG. 10 shows an example of an amplifier power supply voltage range and an amplifier output range each applicable to a liquid crystal display device of another embodiment of the present invention which liquid crystal display device includes positive and negative supply voltages.

Figure 11:
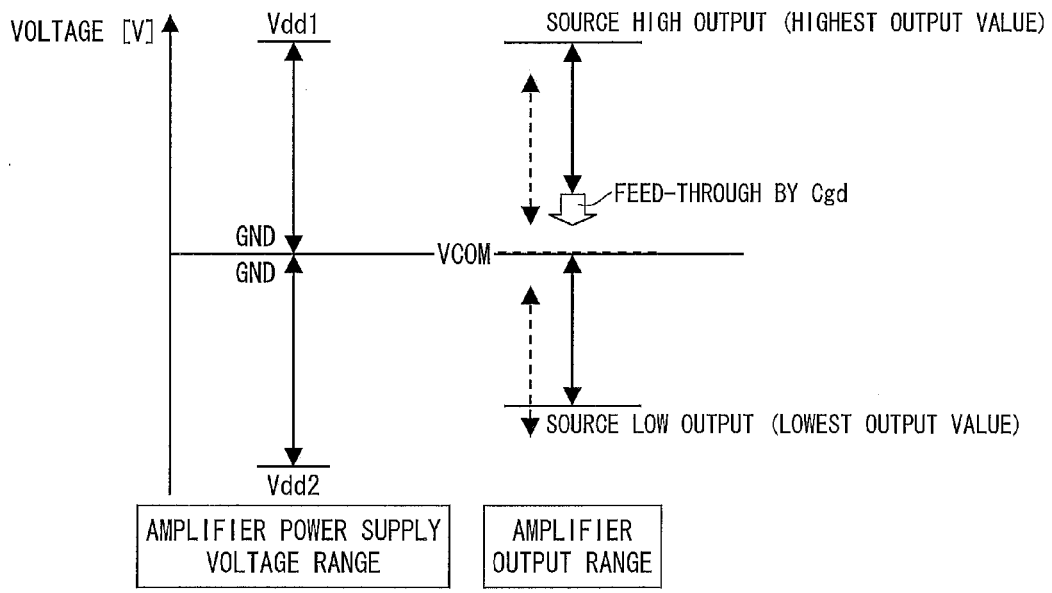

FIG. 11 shows another example of an amplifier power supply voltage range and an amplifier output range each applicable to the liquid crystal display device of another embodiment of the present invention which liquid crystal display device includes the positive and negative supply voltages.

Figure 12:
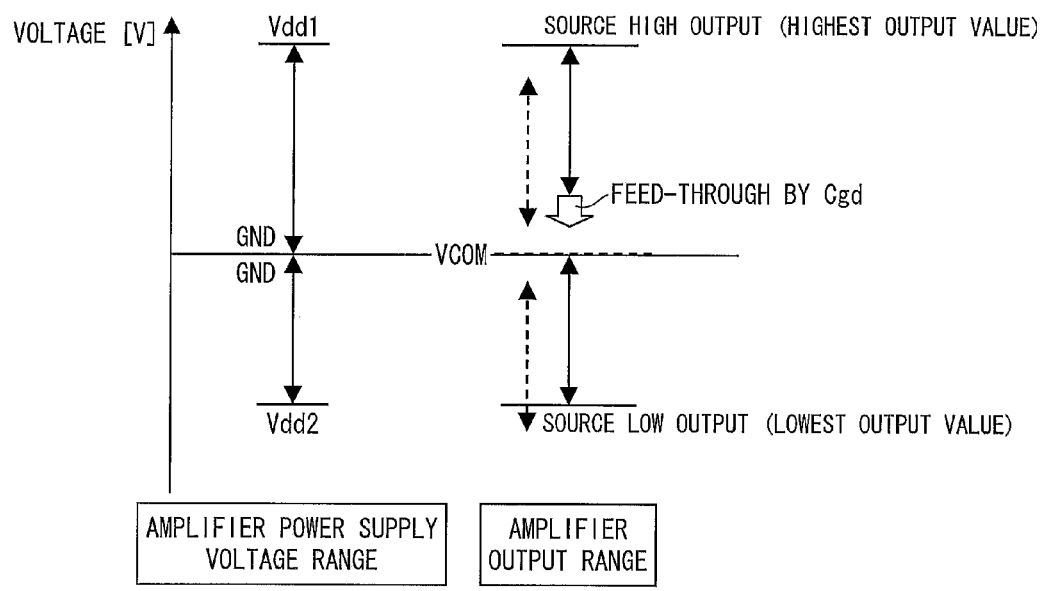

FIG. 12 shows further another example of an amplifier power supply voltage range and an amplifier output range each applicable to the liquid crystal display device of another embodiment of the present invention which liquid crystal display device includes the positive and negative supply voltages.

Figure 13:
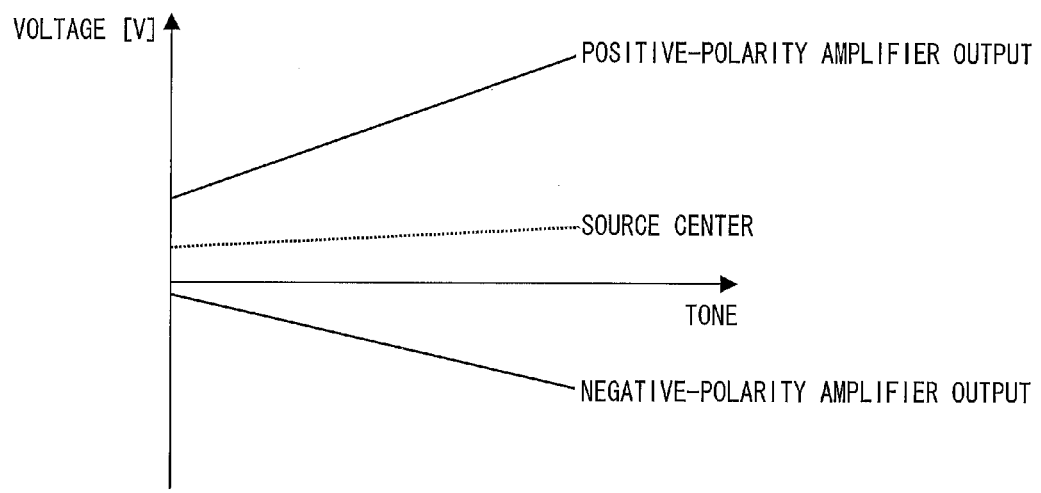

FIG. 13 shows an example where, in the liquid crystal display device of another embodiment of the present invention which liquid crystal display device includes the positive and negative supply voltages, an output value of a positive polarity amplifier circuit and an output value of a negative polarity amplifier circuit are set at every tone in consideration of Ω characteristic.

DESCRIPTION OF EMBODIMENTS

The following describes details of embodiments of the present invention with reference to the drawings. Note that, e.g., sizes, materials, shapes, relative positions of components described in each of the following embodiments do not intend to limit the scope of the present invention, but are merely described as an embodiment.

The following embodiments deal with a liquid crystal display device as an example of a display device. However, a type of the display device is not particularly limited to this, provided that it is a display device which carries out display by use of reverse polarity driving.

Embodiment 1

A first embodiment of the present invention is described below with reference to FIGS. 1 to 7.

Figure 1:
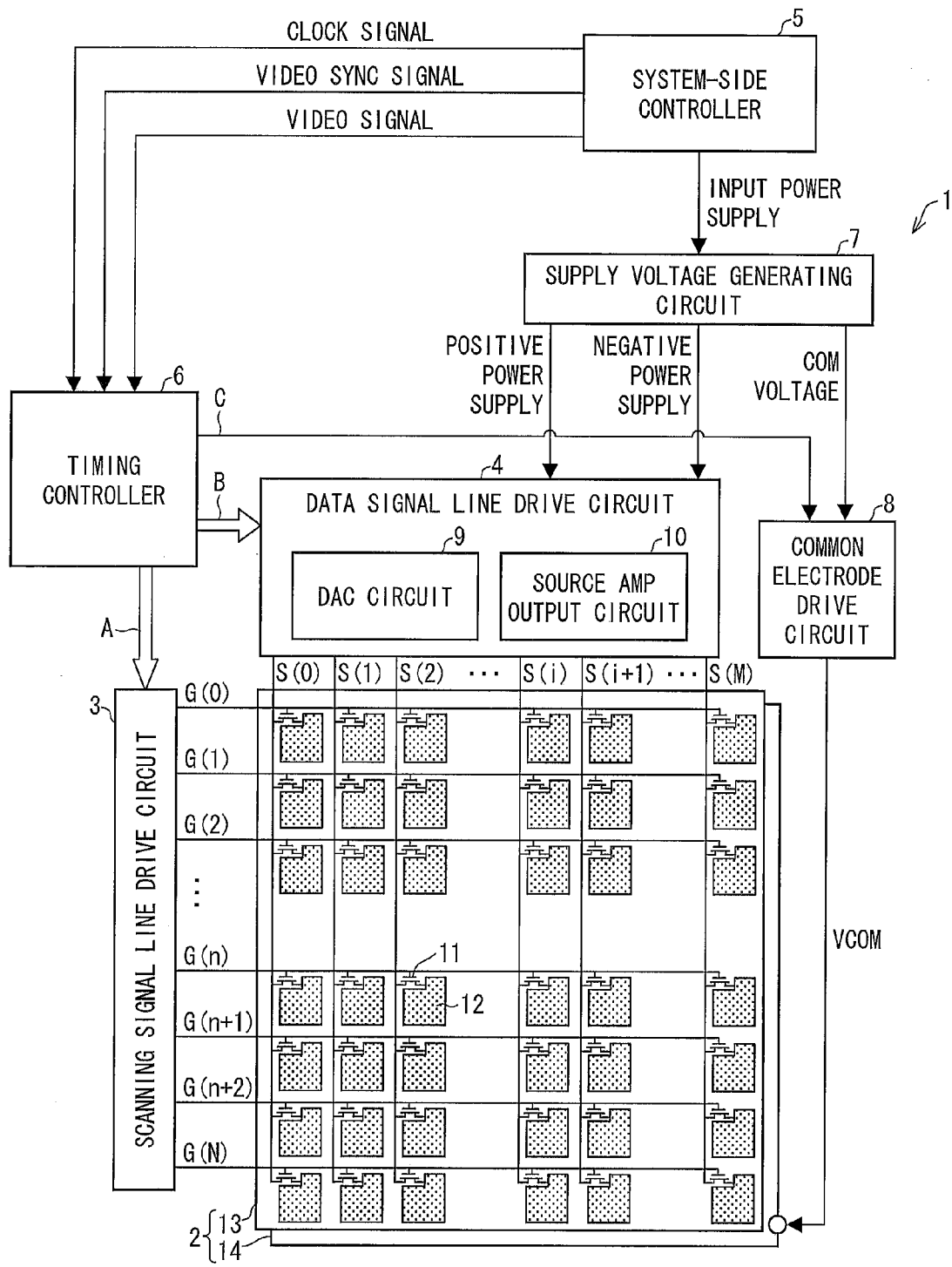
FIG. 1 schematically illustrates a configuration of a liquid crystal display device of an embodiment of the present invention.

FIG. 1 schematically illustrates a configuration of a liquid crystal display device 1.

The liquid crystal display device 1 includes: a liquid crystal display panel 2; a scanning signal line drive circuit (gate driver) 3 for supplying scanning signals to a plurality of scanning signal lines G(0), G(1), . . . G(N); a data signal line drive circuit (source driver) 4 for supplying data signals to a plurality of data signal lines S(0), S(1), . . . S(M); a timing controller 6; a supply voltage generating circuit 7; and a common electrode drive circuit 8 (see FIG. 1).

The present embodiment deals with a case where the supply voltage generating circuit 7 is provided in the liquid crystal display device 1. However, the present invention is not limited to this. Alternatively, the supply voltage generating circuit 7 may be provided in a system-side controller 5.

The system-side controller 5 supplies video signals and video sync signals (Hsync and Vsync) to the timing controller 6, and an input power supply to the supply voltage generating circuit 7.

The supply voltage generating circuit 7 generates positive supply voltages (Vdd1 and Vdd3), negative supply voltages (Vdd2 and Vdd4), a COM voltage, Vcc (not illustrated), Vgh (not illustrated), and Vgl (not illustrated) each of which is necessary for circuits in the liquid crystal device 1 to operate. Further, the supply voltage generating circuit 7 outputs the Vcc, the Vgh, and the Vgl to the scanning line drive circuit 3, outputs the positive supply voltages (Vdd1 and Vdd3), the negative supply voltages (Vdd2 and Vdd4), the Vcc to the data signal line drive circuit 4, outputs the Vcc to the timing controller 6, and outputs the COM voltage to the common electrode drive circuit 8.

Subsequently, based on a clock signal (Clock) and video sync signals (Hsync and Vsync) received from the system side, the timing controller 6 generates a gate clock GCK and a gate start pulse GSP as video sync signals based on which the circuits operate in sync with each other, and supplies the generated gate clock GCK and gate start pulse GSP to the scanning signal line drive circuit 3 (see an arrow A in FIG. 1). Meanwhile, the timing controller 6 outputs, to the data signal line drive circuit 4, (i) a source clock SCK, (ii) a source start pulse SSP, (iii) video data generated from the video signals, which is received from the system side, based on the sync signals (Hsync and Vsync), (see an arrow B in FIG. 1).

Then, the video data is supplied to the data signal lines S(0), S(1), . . . S(M) via a DAC circuit (digital-to-analog convertor) 9 and a source AMP output circuit 10 each included in the data signal line drive circuit 4.

Furthermore, the timing controller 6 supplies a polar signal to the data signal line drive circuit 4 (see the arrow B in FIG. 1) and supplies the polar signal also to the common electrode drive circuit 8 (see an arrow C in FIG. 1).

The liquid crystal display panel 2 including a plurality of pixels arranged in matrix includes: (i) a TFT substrate 13 provided with transistor elements 11 (active elements) each of which is electrically connected to a corresponding one of the plurality of data signal lines S(0), S(1), . . . S(M), a corresponding one of the plurality of scanning signal lines G(0), G(1) . . . G(N), and a corresponding one of pixel electrodes 12 in the vicinity of an intersection of the corresponding one of the plurality of data signal lines S(0), S(1), . . . S(M) and the corresponding one of the plurality of scanning signal lines G(0), G(1) . . . G(N); (ii) a counter substrate 14 including a common electrode; and (iii) a liquid crystal layer (not illustrated) sandwiched between the TFT substrate 13 and the counter substrate 14.

The common electrode drive circuit 8 supplies a common electrode potential VCOM to the common electrode provided in the counter substrate 14.

Figure 2:
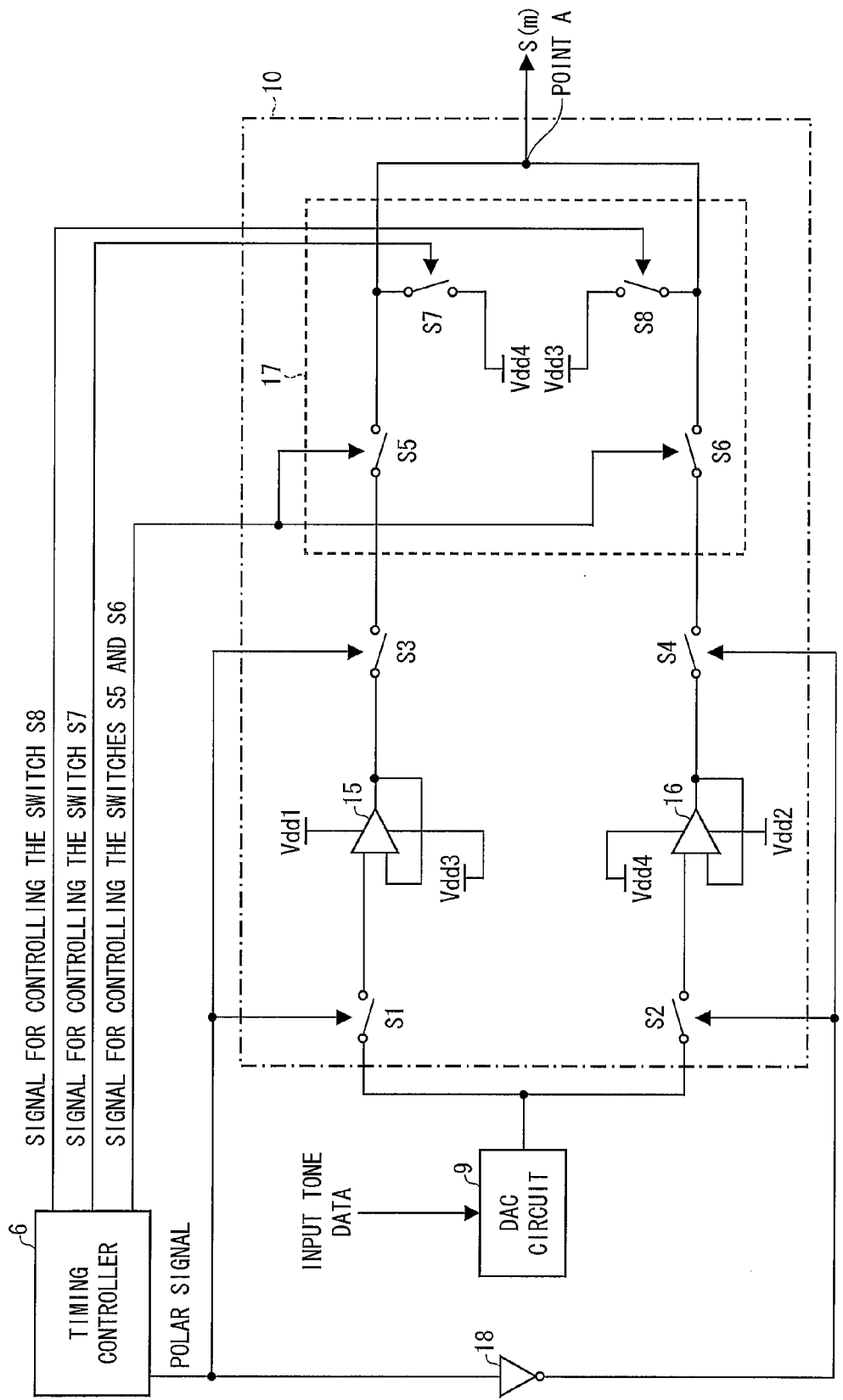
FIG. 2 illustrates a circuit configuration of a source AMP output circuit including a switching circuit provided in the liquid crystal display device of the embodiment of the present invention.

FIG. 2 illustrates a circuit configuration of a source AMP output circuit 10 including a switching circuit 17 of the liquid crystal display device 1.

The source AMP output circuit 10 is provided with the switching circuit 17 for carrying out the following operation. That is, at the time that a polarity is reversed, the switching circuit 17 disconnects the data signal line S(M) from output terminals of the positive polarity amplifier circuit 15 and the negative polarity amplifier circuit 16 each included in the source AMP output circuit 10, and then connects the data signal line S(M) to a power supply which is in the power supply voltage range (Vdd1 to Vdd3) of the positive polarity amplifier circuit 15 or to a power supply which is in the power supply voltage range (Vdd2 to Vdd4) of the negative polarity amplifier circuit 16 (see FIG. 2).

Note that the source AMP output circuit 10 is provided with switches S1, S2, S3, and S4 so that, at the time that the polarity is reversed, a data signal that is to be supplied to the data signal line S(M) via one of the positive polarity amplifier circuit 15 and the negative polarity amplifier circuit 16 is changed to be supplied via the other of the positive polarity amplifier circuit 15 and the negative polarity amplifier circuit 16 to the data signal line S(M) (see FIG. 2).

Polar signals supplied to the switches S2 and S4 are transmitted via an inverter 18. Because of this, the switches S1 and S3 are always supplied with polar signals having polarity reverse to those supplied to the switches S2 and S4.

The present embodiment employs the dot inversion driving. Therefore, the polar signals are reversed at each 1H period (one horizontal period). Accordingly, input tone data inputted to a DAC circuit 9 is outputted via one of the positive polarity amplifier circuit 15 and the negative polarity amplifier circuit 16. Then, 1 H period later, the input tone data is outputted via the other of the positive polarity amplifier circuit 15 and the negative polarity amplifier circuit 16. That is, the input tone data is outputted via the positive polarity amplifier circuit 15 and the negative polarity amplifier circuit 16 alternately at each 1 H period.

Further, switches S5 and S6 provided in the switching circuit 17 are switched between a connected (short) state to a disconnected (open) state, in response to a single control signal (a signal for controlling the switches S5 and S6) supplied from the timing controller 6.

That is, the switches S5 and S6 are switches for disconnecting/connecting the data signal line S(M) from/to the output terminals of the positive polarity amplifier circuit 15 and the negative polarity amplifier circuit 16.

In the present embodiment, a potential level of the power supply to which the data signal line S(M) is connected after being disconnected from the output terminals of the positive polarity amplifier circuit 15 and the negative polarity amplifier circuit 16 is Vdd3, which is in the power supply voltage range of the positive polarity amplifier circuit 15, or Vdd4, which is in the power supply voltage range of the negative polarity amplifier circuit 16. However, the present invention is not limited to this.

The switching circuit 17 is further provided with switches S7 and S8. The switch S7 serves as a switch for connecting the data signal line S(M) to a power supply Vdd4, and the switch S8 serves as a switch for connecting the data signal line S(M) to a power supply Vdd3.

The switch S7 is supplied with a signal for controlling the switch S7 from the timing controller 6, and the switch S8 is supplied with a signal for controlling the switch S8 from the timing controller 6. The signal for controlling the switch S7 and the signal for controlling the switch S8 are control signals independent of each other.

Figure 3:
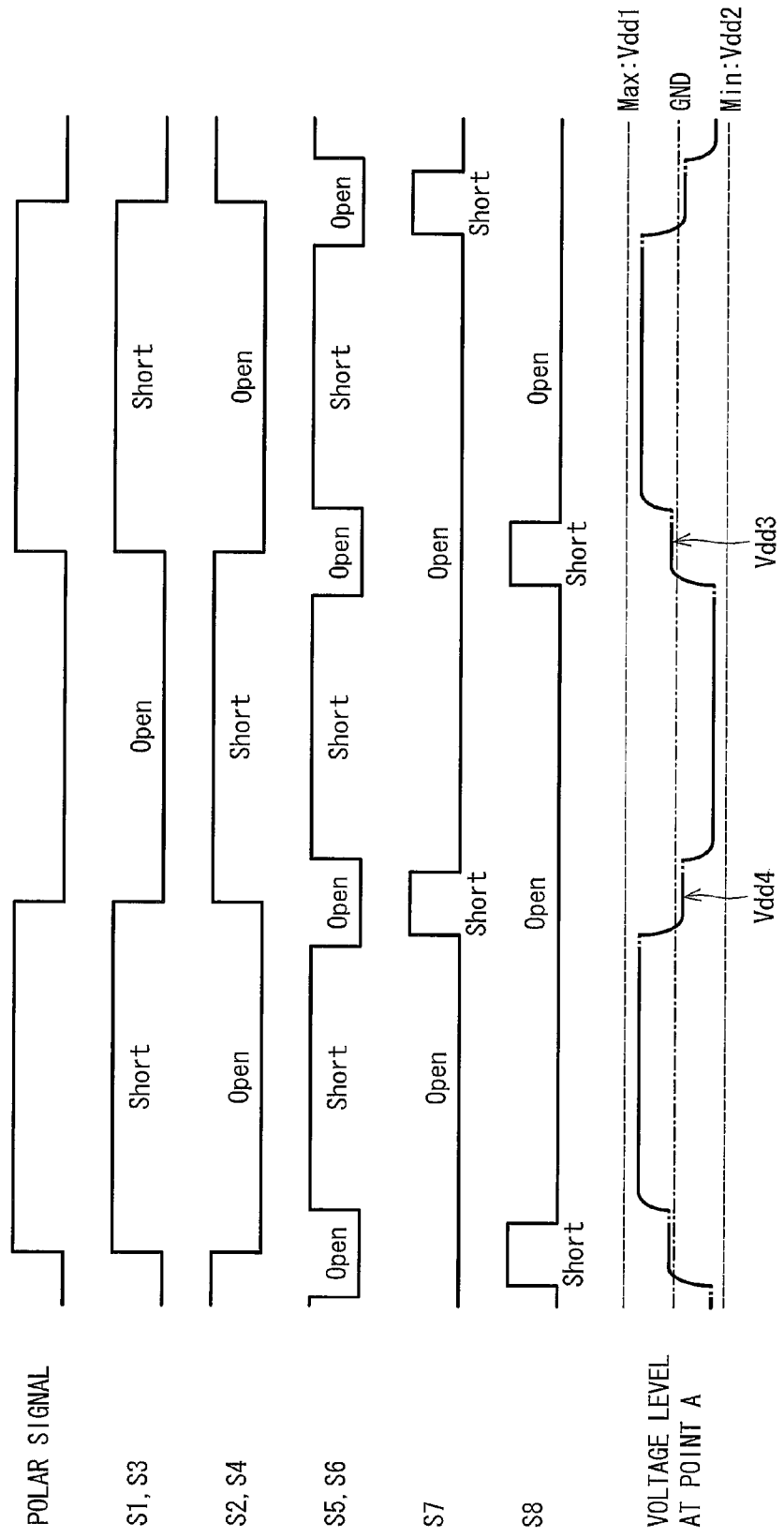
FIG. 3 illustrates a timing chart of how the source AMP output circuit shown in FIG. 2 is driven.

FIG. 3 shows a timing chart of how the source AMP output circuit 10 of the liquid crystal display device 1 is driven.

The switches S1 and S3 and the switches S2 and S4 are alternately put into a connected (short) state at each 1 H period. The switches S5 and S6 are put into a disconnected (open) state at a timing when the polar signals are reversed, namely, a given period before a timing when a change occurs in the states of the switches S1, S2, S3, and S4. Another given period after the change occurred in the states of the switches S1, S2, S3, and S4, the switches S5 and S6 are put into the connected (short) state again (see FIG. 3).

By putting the switches S5 and S6 into the disconnected (open) state, it is possible to disconnect the data signal line S(M) from the output terminals of the positive polarity amplifier circuit 15 and the negative polarity amplifier circuit 16. Further, while the switches S5 and S6 are thus in the disconnected (open) state, the switches S7 and S8 are alternately put into the connected (short) state for a given period.

A timing at which the switch S7 or the switch S8 is put into the connected (short) state is set to a given period before a timing at which the switches S5 and S6 are put into the connected (short) state.

By the setting as described above, a potential level at point A can be set to Vdd4, which is in the power supply voltage range of the negative polarity amplifier circuit 16, before the data signal line S(M) is electrically connected to the negative polarity amplifier circuit 16. Meanwhile, the potential level at point A can be set to Vdd3, which is in the power supply voltage range of the positive polarity amplifier circuit 15, before the data signal line S(M) is electrically connected to the positive polarity amplifier circuit 15 (see FIG. 3).

The potential level at point A during a period between the disconnected (open) state of the switches S5 and S6 and the connected (short) state of the switch S7 or the switch S8 is indicated by a dotted line. This is because that, during such the period, point A can be put into a high impedance state or can be connected to, e.g., the power supply, and thus the potential level at point A has an uncertain waveform (see FIG. 3).

As described above, according to this configuration, the switching circuit 17 is configured as follows: In order that a polarity of a data signal supplied from the data signal line drive circuit 4 is reversed from positive polarity to negative polarity in response to a polar signal, the switching circuit 17 electrically disconnects the data signal line S(M) from the positive polarity amplifier circuit 15 and the negative polarity amplifier circuit 16, and thereafter connects, for a given period, the data signal line S(M) to the power supply Vdd4, which is in the power supply voltage range of the negative polarity amplifier circuit 16. Meanwhile, in a case where a polarity of a data signal supplied from the data signal line drive circuit 4 is reversed from negative polarity to positive polarity in response to a polar signal, the switching circuit 17 electrically disconnects the data signal line S(M) from the positive polarity amplifier circuit 15 and the negative polarity amplifier circuit 16, and thereafter connects, for a given period, the data signal line S(M) to the power supply Vdd3, which is in the power supply voltage range of the positive polarity amplifier circuit 15.

Accordingly, it is possible to prevent a damage of the positive polarity amplifier circuit 15 and the negative polarity amplifier circuit 16.

Therefore, according to the configuration, it is possible to provide the liquid crystal display device 1 which consumes less electric power and secures reliability.

(a) of FIG. 4 illustrates a configuration of an amplifier circuit 100 of a conventional liquid crystal display device.

The amplifier circuit 100 is configured to be connected to GND (earth terminal) and to be supplied with a power supply Vdd (see (a) of FIG. 4).

Since the conventional liquid crystal display uses the power supply Vdd of 12V, the amplifier circuit 100 has a high-voltage input/output range of 0V to 12V. Thus, the amplifier circuit 100 is required to have high withstand voltage.

Therefore, the amplifier circuit 100 has not only a problem of a relatively large size but also a problem of high electric power consumption.

On the other hand, (b) of FIG. 4 illustrates a configuration of the amplifier circuit employed in the liquid crystal display device 1.

The positive polarity amplifier circuit 15 is supplied with the positive supply voltage Vdd1 as the high power supply voltage, and the positive supply voltage Vdd3 as the low power supply voltage, each of which positive supply voltages is generated by the supply voltage generating circuit 7. The negative polarity amplifier circuit 16 is supplied with the negative supply voltage Vdd4 as the high power supply voltage, and the negative supply voltage Vdd2 as the low power supply voltage, each of which negative supply voltages is generated by the supply voltage generating circuit 7 (see (b) of FIG. 4).

Thus, the positive polarity amplifier circuit 15 has an input/output range (positive output range) of Vdd3 to Vdd1, whereas the negative polarity amplifier circuit 16 has an input/output range (negative output range) of Vdd2 to Vdd4.

In the present embodiment, Vdd1 supplied to the positive polarity amplifier circuit 15 and Vdd2 supplied to the negative polarity amplifier circuit 16 are each set to have an absolute value of a voltage level (6V), which is approximately half of a power supply Vdd (12V) supplied to the conventional amplifier circuit 100.

In the present embodiment, for simplification of a circuit configuration of a supply voltage boosting circuit in the supply voltage generating circuit 7, Vdd1, which is a positive supply voltage, and Vdd2, which is a negative supply voltage, are set to be at the same potential level. However, the present invention is not limited to this. A magnitude relation between absolute values of voltage values of Vdd1 and Vdd2 is not so much of a problem.

Furthermore, the effect of simplifying the circuit configuration of the supply voltage boosting circuit can be obtained even if Vdd1 and Vdd2 are not set at the same potential level, provided that a difference between the absolute values of voltage values of Vdd1 and Vdd2 is not more than 0.5V.

However, with the configuration illustrated in (b) of FIG. 4, in order that the amplifier circuit obtains an advantageous effect in respect to a size and electric power consumption over the conventional amplifier circuit 100, the amplifier circuit is recommended to be designed so that a sum of (i) an absolute value of a difference between Vdd1 and Vdd3 and (ii) an absolute value of a difference between Vdd2 and Vdd4 is substantially equal to a withstand voltage value (Vdd-GND) of the conventional amplifier circuit 100 shown in (a) of FIG. 4.

In the present embodiment, after the data signal line S(M) is electrically disconnected from the positive polarity amplifier circuit 15 and the negative polarity amplifier circuit 16, the dat a signal line S(M) is connected, for a given period, to the power supply voltage Vdd4, which is in the power supply voltage range of the negative polarity amplifier circuit 16; alternatively, after the data signal line S(M) is electrically disconnected from the positive polarity amplifier circuit 15 and the negative polarity amplifier circuit 16, the data signal line S(M) is connected, for a given period, to the power supply voltage Vdd3, which is in the power supply voltage range of the positive polarity amplifier circuit 15. However, the present invention is not limited to this. Alternatively, after the data signal line S(M) is electrically disconnected from the positive polarity amplifier circuit 15 and the negative polarity amplifier circuit 16, the data signal line S(M) may be connected to a node which is in the power supply voltage range of the positive polarity amplifier circuit 15 or the negative polarity amplifier circuit 16.

Further alternatively, after the data signal line S(M) is electrically disconnected from the positive polarity amplifier circuit 15 and the negative polarity amplifier circuit 16, the data signal line S(M) may be connected to GND via the switches S7 and S8 (see FIG. 5).

FIG. 5 shows a circuit configuration of a source AMP output circuit 10a including another switching circuit 17a which is applicable to the liquid crystal display device 1.

The source AMP output circuit 10a is provided with the switching circuit 17a including switches S5, S6, S7, and S8 for carrying out the following operation, That is, at the time that a polarity is reversed, the switches S5, S6, S7, and S8 disconnect the data signal line S(m) from the output terminals of the positive polarity amplifier circuit 15 and the negative polarity amplifier circuit 16, and then connect the data signal line S(m) to GND (see FIG. 5).

FIG. 6 shows a timing chart of how the source AMP output circuit 10a shown in FIG. 5 is driven.

The switches S1 and S3 and the switches S2 and S4 are alternately put into a connected (short) state at each 1 H period. The switches S5 and S6 are put into a disconnected (open) state at a timing when the polar signals are reversed, namely, a given period before a timing when a change occurs in the states of the switches S1, S2, S3, and S4. Another given period after the change occurred in the states of the switches S1, S2, S3, and S4, the switches S5 and S6 are put into the connected (short) state again (see FIG. 6).

By putting the switches S5 and S6 into the disconnected (open) state, it is possible to disconnect the data signal line S(m) from the output terminals of the positive polarity amplifier circuit 15 and the negative polarity amplifier circuit 16. Further, while the switches S5 and S6 are thus in the disconnected (open) state, the switches S7 and S8 are put into the connected (short) state for a given period, so the data signal line S(m) is to be connected to GND for a given period. This makes it possible to make a potential of the data signal line S(m) closer to a GND level at the time of reversing a polar signal.

The potential level at point A during a period between the disconnected (open) state of the switches S5 and S6 and the connected (short) state of the switches S7 and S8 is indicated by a dotted line. This is because that, during such the period, point A can be put into a high impedance state or can be connected to e.g., the power supply, and thus the potential level at point A has an uncertain waveform (see FIG. 6).

According to the configuration, the potential of the data signal line S(m) can be set at a GND level, which is substantially an intermediate value between the power supply voltage Vdd1 of the positive polarity amplifier circuit and the power supply voltage Vdd2 of the negative polarity amplifier circuit 16. This makes it possible to prevent a damage of the positive polarity amplifier circuit 15 and the negative polarity amplifier circuit 16. Furthermore, since the data signal line S(m) is connected to GND, there is no unnecessary transmission of electric charge. Therefore, no increase occurs in electric power for driving the data signal line S(m).

FIG. 7 illustrates a configuration of the conventional amplifier circuit and a configuration of an amplifier circuit provided in the source AMP output circuit 10a shown in FIG. 5.

(a) of FIG. 7 which is similar to (a) of FIG. 4 is not described here repeatedly. (b) of FIG. 7 illustrates the configuration of the amplifier circuit provided in the source AMP output circuit 10a.

The positive polarity amplifier circuit 15 is supplied with Vdd1 as a high power supply voltage and GND (0V) as a low power supply voltage (see (b) of FIG. 7). Meanwhile, the negative polarity amplifier circuit 16 is supplied with GND (0V) as a high power supply voltage and Vdd2 as a low power supply voltage.

According to this configuration, the low power supply voltage of the positive polarity amplifier circuit 15 and the high power supply voltage of the negative polarity amplifier circuit 16 share the same power supply voltage. With this, it is possible to further reduce the number of power supply voltages to be prepared for the positive polarity amplifier circuit 15 and the negative polarity amplifier circuit 16, thereby providing a liquid crystal display device consuming less electric power with a simple circuit configuration.

Also with the configuration illustrated in (b) of FIG. 7, in order that the amplifier circuit obtains an advantageous effect in respect to a size and electric power consumption over the conventional amplifier circuit 100, the amplifier circuit is recommended to be designed so that a sum of (i) an absolute value of a difference between Vdd1 and GND and (ii) an absolute value of a difference between Vdd2 and GND is substantially equal to a withstand voltage value (Vdd-GND) of the conventional amplifier circuit 100 shown in (a) of FIG. 7.

Embodiment 2

Next, a second embodiment of the present invention is described below with reference to FIGS. 8 to 13. A liquid crystal display device of the present embodiment is different from that of Embodiment 1 in the following point: In a case where the liquid crystal display device of the present embodiment and the liquid crystal display device of Embodiment 1 each includes a common electrode, it is possible to adjust a potential level of the common electrode relatively easily in the liquid crystal display device of the present embodiment than in the liquid crystal display device of Embodiment 1. This is because that the liquid crystal display device of the present embodiment includes, in addition to the configuration of Embodiment 1, a positive polarity amplifier circuit 15 and a negative polarity amplifier circuit 16 whose outputs are set so that (i) an absolute value of a highest output value of the positive polarity amplifier circuit 15 and (ii) an absolute value of a lowest output value of the negative polarity amplifier circuit 16 are different from each other. Except for this, the liquid crystal display device of the present embodiment has the same configuration as that described in Embodiment 1.

FIG. 8 illustrates feed-through of a drain potential by Cgd and schematically illustrates a circuit configuration of a (one) pixel in a display area of the liquid crystal display device 1.

A potential level of a drain electrode of a transistor element 11 provided in each pixel of the liquid crystal display device 1 is first charged by a signal voltage Vs supplied from a data signal line Si via the transistor element 11. Thereafter, however, the potential level changes by a parasitic capacitance Cgd and a change in a voltage of a scanning signal line Gj (from Vgh to Vgl) (see FIG. 8).

Either in a case where the potential level is positive or in a case where the potential level is negative, the change in the potential level due to feed-through is to change the potential level towards Vgl. Such a change in the potential level causes a center value (source center) between the potential level at the drive in the positive polarity and the potential level at the drive in the negative polarity to be shifted. Accordingly, it is necessary to adjust a common electrode potential level VCOM.

The following formula (1) represents an amount of change (feed-through amount) of a voltage of the drain electrode, the change being caused by Cgd which is indicated by a heavy line in FIG. 8.

$$\Delta Vgd = (Cgd/\Sigma C) \times \Delta Vg \quad \text{Formula (1)}$$

Note here that ΣC is substantially equal to Cls+Ccs+Cgd+Csd1+Csd2, and ΔVg is an absolute value of Vgh−Vgl.

Clc denotes a liquid crystal capacitance between the drain electrode and the common electrode. Ccs denotes a storage capacitance between the drain electrode and a CS electrode. Csd1 denotes a parasitic capacitance between the drain electrode and the data signal line Si. Csd2 denotes a parasitic capacitance between the drain electrode and the data signal line Si+1. Cgd denotes a parasitic capacitance between the drain electrode and the scanning signal line Gj.

Assuming that (i) a highest value of the signal voltage Vs supplied from the data signal line Si is Vsh and (ii) a lowest value of the signal voltage Vs is Vsl, a drain potential after the highest value of the signal voltage Vs is changed (i.e., a voltage after feed-through) is Vsh−ΔVgd, whereas a drain potential after the lowest value of the signal voltage Vs is changed (i.e., a voltage after feed-through) is Vsl−ΔVgd.

Further, a voltage after the center value of the drain electrode is changed (i.e., a voltage after feed-through) is an average of (i) a voltage after the highest value of the signal voltage Vs is changed (i.e., a voltage after feed-through) and (ii) a voltage after the lowest value of the signal voltage Vs is changed (i.e., a voltage after feed-through), which average is represented by "{(Vsh−ΔVgd)+(Vsl−ΔVgd)}/2", namely, "(Vsh+Vsl)/2−ΔVgd".

FIG. 9 illustrates (i) an amplifier power supply voltage range and an amplifier output range each applied to the conventional liquid crystal display device and (ii) an amplifier power supply voltage range and an amplifier output range each applicable to a configuration including positive and negative supply voltages.

(a) of FIG. 9 shows the amplifier power supply voltage range and the amplifier output range in a case where either one of the amplifier circuits 100 shown in (a) of FIG. 4 and (a) of FIG. 7 is used.

In a case where (i) the amplifier power supply voltage range is set to be from Vdd (12V) to GND (0V) and (ii) the amplifier output range is set to be from a source high output (highest output value: 11V) to a source low output (lowest output value: 1V), a center value (source center) is 6V, and VCOM is set in consideration of feed-through of the center value (source center) by Cgd (see (a) of FIG. 9).

Because the feed-through amount by Cgd varies depending on the module, VCOM is to be adjusted within an adjustable range (shown in (a) and (b) of FIG. 9) of the individual module.

In the amplifier output range, a solid line indicates an output value from the amplifier, and a dotted line indicates a potential level after feed-through by Cgd.

(b) of FIG. 9 illustrates the amplifier power supply voltage range and the amplifier output range each could be applied to the configuration in which either one of the positive polarity amplifier circuit 15 and the negative polarity amplifier circuit 16 shown in (b) of FIG. 4 and the positive polarity amplifier circuit 15 and the negative polarity amplifier circuit 16 shown in (b) of FIG. 7 is used.

In a case where (i) the amplifier power supply voltage range of the positive polarity amplifier circuit 15 is set to be from Vdd1 (6V) to GND (0V), (ii) the amplifier power supply voltage range of the negative polarity amplifier circuit 16 is set to be from Vdd2 (−6V) to GND (0V), (iii) the output range of the positive polarity amplifier circuit 15 is set to be from a source high output (highest output value: 5V) to GND (0V), and (iv) the output range of the negative polarity amplifier circuit 16 is set to be from GND (0V) to the source low output (lowest output value: −5V), the center value (source center) is 0V, and VCOM is set in consideration of feed-through of the center value (source center) by Cgd (see (b) of FIG. 9).

However, with the above-described setting, an adjustable range for VCOM comes closer to 0V. This causes a problem that it is difficult to output a stable potential level VCOM.

In order to deal with this, in the present embodiment, as shown in FIG. 10, the outputs of the positive polarity amplifier circuit 15 and the negative polarity amplifier circuit 16 are set so that (i) an absolute value of a source high output (highest output value) of the positive polarity amplifier circuit 15 and (ii) an absolute value of a source low output (lowest output value) of the negative polarity amplifier circuit 16 are different from each other.

That is, in FIG. 10, the source high output (highest output value) of the positive polarity amplifier circuit 15 is set to 5V, and the source low output (lowest output value) of the negative polarity amplifier circuit 16 is set to −5.5V so that (i) the absolute value of the source high output (highest output value) of the positive polarity amplifier circuit 15 and (ii) the absolute value of the source low output (lowest output value) of the negative polarity amplifier circuit 16 are different from each other.

According to the above setting, a center value (source center) is −0.25V. Thus, VCOM can be set to be relatively far from 0V, in consideration of feed-through of the center value (source center) by Cgd. Thus, it is possible to solve the problem that it is difficult to output at a stable potential level VCOM.

In the present embodiment, source output values such as the source high output (highest output value) and the source low output (lowest output value) are changed by changing a resistance ratio in the DAC circuit illustrated in FIG. 1. However, the present invention is not limited to this.

FIG. 11 shows another example of an amplifier power supply voltage range and an amplifier output range each applicable to the liquid crystal display device 1.

In FIG. 11, a source high output (highest output value) of a positive polarity amplifier circuit 15 is set to 5.8V, a the source low output (lowest output value) of a negative polarity amplifier circuit 16 is set to −4.8V so that (i) an absolute value of the source high output (highest output value) of the positive polarity amplifier circuit 15 and (ii) an absolute value of the source low output (lowest output value) of the negative polarity amplifier circuit 16 are different from each other.

According to the above setting, a center value (source center) is 0.5V and a feed-through amount of the center value (source center) by Cgd is 0.5V. Thus, VCOM can be set to GND (0V).

According to this configuration, it is not necessary to separately generate a power supply which is to be supplied to a common electrode. Therefore, it is possible to provide a liquid crystal display device consuming less electric power with a simple circuit configuration.

The feed-through amount of the center value (source center) by Cgd slightly varies depending on the liquid crystal display panel and/or the tone. In the above case, the feed-thorough amount of the center value (source center) by Cgd observed at a maximum tone is set as a reference value.

In the above case, the feed-through amount of the center value (source center) by Cgd observed at the maximum tone is set as the reference value. However, the present invention is not limited to this. Alternatively, a feed-thorough amount of the center value (source center) by Cgd observed at a tone which is not the maximum tone may be set as the reference value.

FIG. 12 shows further another example of an amplifier power supply voltage range and an amplifier output range each applicable to the liquid crystal display device 1.

In FIG. 12, as is the configuration of FIG. 11, a source high output (highest output value) of a positive polarity amplifier circuit 15 is set to 5.8V, and a source low output (lowest output value) of a negative polarity amplifier circuit 16 is set to −4.8V so that (i) an absolute value of the source high output (highest output value) of the positive polarity amplifier circuit 15 and (ii) an absolute value of the source low output (lowest output value) of the negative polarity amplifier circuit 16 are different from each other.

The configuration of FIG. 12 is different from the configuration of FIG. 11 in that (i) the amplifier power supply voltage range of the positive polarity amplifier circuit 15 is set to be from Vdd1 (6V) to GND (0V) and the amplifier power supply voltage range of the negative polarity amplifier circuit is set to be from GND (0V) to Vdd2 (−6V) in the configuration of FIG. 11, whereas (ii) an amplifier power supply voltage range of the positive polarity amplifier circuit 15 is set to be from Vdd1 (6V) to GND (0V) and an amplifier power supply voltage range of the negative polarity amplifier circuit 16 is set to be from GND (0V) to Vdd2 (−5V) in the configuration of FIG. 12.

By changing the amplifier power supply voltage range of the negative polarity amplifier circuit 16 according to the output range of the negative polarity amplifier circuit 16 in this manner, it is possible to reduce electric power consumption by 8% as described below. An electric power consumption with each of the settings of FIGS. 11 and 12 can be calculated by the following formula (2).

$$P = c \times f \times Vsh \times Vdd1 + c \times f \times Vsl \times Vdd2 \quad \text{Formula (2)}$$

With the setting of FIG. 11, the electric power consumption is 63.6 cf according to the formula "$c \times f \times \{(5.8 \times 6) + (-4.8 \times -6)\}$". Note here that c denotes a capacitance, and f denotes a frequency.

On the other hand, with the setting of FIG. 12, the electric power consumption is 58.8 cf according to the formula "$c \times f \times \{(5.8 \times 6) + (-4.8 \times -5)\}$".

In the present embodiment, a low power supply voltage of an amplifier is set to GND. However, the present invention is not limited to this.

In the present embodiment, not only the source high output (highest output value) of the positive polarity amplifier circuit 15 and the source low output (lowest output value) of the negative polarity amplifier circuit 16 each of which is observed at the maximum tone but also an average of an output value of the positive polarity amplifier circuit 15 and an output value of the negative polarity amplifier circuit 16 is set so as to vary depending on the tone, in an entire output range of the positive polarity amplifier circuit and an entire output range of the negative polarity amplifier circuit 16, at the timing that a signal supplied to the scanning signal line changes from high to low, and according to a change amount (Ω characteristic) of a data signal supplied via the data signal line and the transistor element which change amount varies depending on the tone (see FIG. 13).

As shown in FIG. 13, a source center line is slightly tilted to the upper right.

According to the above configuration, at the timing that the signal supplied to the scanning signal line changes from high to low, it is possible to adjust a potential level of the common electrode in consideration of the Ω characteristic, which is the change amount of the data signal supplied via the data signal line and the transistor element, the change amount varying depending on the tone. This makes it possible to reduce flickers, thereby providing a liquid crystal display device with a high display quality.

The present embodiment employs a normally black liquid crystal display device. Therefore, in the present embodiment, as shown in FIG. 13, absolute values of outputs of both the positive polarity amplifier circuit and the negative polarity amplifier circuit linearly increase with a rise in the tone so that a low voltage is supplied for a low tone (dark tone) and a high voltage is supplied for a high tone (bright tone) (see FIG. 13). However, the present invention is not limited to this. In a case of using a normally white liquid crystal display device, operation opposite to the above is carried out.

The display device of the present embodiment is preferably configured such that, in a case where a polarity of a data signal supplied from the data signal line drive circuit to the corresponding one of the plurality of data signal lines is reversed from positive to negative, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the negative polarity amplifier circuit; and in a case where the polarity of the data signal supplied from the data signal line drive circuit to the corresponding one of the plurality of data signal lines is reversed from negative to positive, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the positive polarity amplifier circuit.

According to the configuration, in a case where a polarity of a data signal supplied from the data signal line drive circuit is reversed from one polarity to another polarity, the switching circuit electrically disconnects the corresponding one of the plurality of data signal lines from the positive polarity amplifier circuit and the negative polarity amplifier circuit, and then makes the potential level of the corresponding one of the plurality of data signal lines closer to a potential level which is in a power supply voltage range of a polarity amplifier circuit having said another polarity. Thereafter, the switching circuit electrically connects said each of the plurality of data signal lines to that polarity amplifier circuit. This makes it possible to prevent a damage of the positive amplifier circuit and the negative polarity amplifier circuit.

The display device of the present invention is preferably configured such that the node has a potential level observed when the node is grounded.

According to the configuration, since the node has a potential level observed when the node is grounded, the switching circuit can electrically connect the corresponding one of the plurality of data signal lines to that amplifier circuit after electrically disconnecting the corresponding one of the plurality of data signal lines from the positive polarity amplifier circuit and the negative polarity amplifier circuit and then making a potential of the corresponding one of the plurality of data signal lines closer to the potential level observed when the node is grounded. This does not cause unnecessary transmission of electric charge and does not increase electric power to drive the data signal lines. Therefore, it is possible to provide a display device consuming less electric power.

The display device of the present invention is preferably configured such that an output of the positive polarity amplifier circuit and an output of the negative polarity amplifier circuit are set so that (i) an absolute value of a highest output value of the positive polarity amplifier circuit and (ii) an absolute value of a lowest output value of the negative polarity amplifier circuit are different from each other.

According to the configuration, the output of the positive polarity amplifier circuit and the output of the negative polarity amplifier circuit are set so that (i) the absolute value of the highest output value of the positive polarity amplifier circuit and (ii) the absolute value of the lowest output value of the negative polarity amplifier circuit are different from each other. With this, in a display device including a common electrode, it is possible to relatively easily adjust a potential level of the common electrode.

The display device of the present invention is preferably configured such that the output of the positive polarity amplifier circuit and the output of the negative polarity amplifier circuit are set so that the absolute value of the lowest output value of the negative polarity amplifier circuit is larger than the absolute value of the highest output value of the positive polarity amplifier circuit.

According to the configuration, in the display device including the common electrode, it is possible to set a range of the potential level of the common electrode to be a range where a common electrode voltage can be stably outputted.

The display device of the present invention is preferably configured to further include: a scanning signal line drive circuit; a plurality of scanning signal lines provided in a display area of the display device and connected to the scanning signal line drive circuit so as to intersect the plurality of data signal lines; and active elements each of which is electrically connected to a corresponding one of the plurality of data signal lines and a corresponding one of the plurality of scanning signal lines, in the vicinity of an intersection of the corresponding one of the plurality of data signal lines and the corresponding one of the plurality of scanning signal lines, the output of the positive polarity amplifier circuit and the output of the negative polarity amplifier circuit being set so that, at a timing that a signal supplied to a corresponding one of the plurality of scanning signal lines is changed from high to low, the absolute value of the highest output value of the positive polarity amplifier circuit is larger than the absolute value of the lowest output value of the negative polarity amplifier circuit by a change amount of a data signal supplied via a corresponding one of the plurality of data signal lines and a corresponding one of the active elements.

According to the configuration, at a timing that a signal supplied to a corresponding one of the plurality of scanning signal lines is changed from high to low, the absolute value of the highest output value of the positive polarity amplifier circuit is larger than the absolute value of the lowest output value of the negative polarity amplifier circuit by a change amount of a data signal supplied via a corresponding one of the plurality of data signal lines and a corresponding one of the active elements. Therefore, in the display device including the common electrode, it is possible to set the potential level of the common electrode at a GND level.

Thus, it is not necessary to separately generate a power supply which is to be supplied to the common electrode. Therefore, it is possible to realize a display device consuming less electric power consumption with a simple circuit configuration.

The display device of the present invention is preferably configured such that (i) an absolute value of a high power supply voltage of the positive polarity amplifier circuit and (ii) an absolute value of a low power supply voltage of the negative polarity amplifier circuit are set so as to be different from each other, according to the highest output value of the positive polarity amplifier circuit and the lowest output value of the negative polarity amplifier circuit.

According to the configuration, it is possible to individually set each of (i) the high power supply voltage of the positive polarity amplifier circuit and (ii) the low power supply voltage of the negative polarity amplifier circuit at an optimum level according to the highest output value of the positive polarity amplifier circuit and the lowest output value of the negative polarity amplifier circuit. This makes it possible to provide a display device consuming less electric power.

The display device of the present invention is configured to further include: a scanning signal line drive circuit; a plurality of scanning signal lines provided in a display area of the display device and connected to the scanning signal line drive circuit so as to intersect the plurality of data signal lines; and active elements each of which is electrically connected to a corresponding one of the plurality of data signal lines and a corresponding one of the plurality of scanning signal lines, in the vicinity of an intersection of the corresponding one of the plurality of data signal lines and the corresponding one of the plurality of scanning signal lines, an average of the output of the positive polarity amplifier circuit and the output of the negative polarity amplifier circuit being set so as to vary depending on a tone, in an entire output range of the positive polarity amplifier circuit and an entire output range of the negative polarity amplifier circuit, at a timing that a signal supplied to a corresponding one of the plurality of scanning signal lines changes from high to low, and according to a change amount of a data signal supplied via a corresponding one of the plurality of data signal lines and a corresponding one of the active elements which change amount varies depending on a tone.

The configuration enables an adjustment of a potential level of the common electrode in consideration of Ω characteristic, which is the change amount of the data signal supplied via the corresponding one of the plurality of data signal lines and the corresponding one of the active elements which change amount varies depending on the tone, at the timing that the signal supplied to the corresponding one of the plurality of scanning signal lines changes from high to low. This makes it possible to reduce flickers, thereby providing a display device with a high display quality.

The display device of the present invention is preferably configured such that a low power supply voltage of the positive polarity amplifier circuit and a high power supply voltage of the negative polarity amplifier circuit share a same power supply voltage.

According to the configuration, the number of power supplies to be prepared for the positive polarity amplifier circuit and the negative polarity amplifier circuit can be reduced. Thus, it is possible to produce a display device consuming less electric power with a simple circuit configuration.

The display device of the present invention is preferably configured such that the same power supply voltage has a potential level observed when the same power supply voltage is grounded.

According to the configuration, the number of power supplies to be prepared for the positive polarity amplifier circuit and the negative polarity amplifier circuit can be further reduced. Thus, it is possible to provide a display device consuming less electric power with a simple circuit configuration.

The display device of the present invention is preferably configured such that a difference between (i) an absolute value of the high power supply voltage of the positive polarity amplifier circuit and (ii) an absolute value of the low power supply voltage of the negative polarity amplifier circuit is not more than 0.5V.

According to the configuration, positive and negative supply voltage voltages respectively supplied to the positive polarity amplifier circuit and the negative polarity amplifier circuit have similar potential levels. This allows the power supply voltage circuit to have a simple circuit configuration.

The display device of the present invention may be configured such that the data signal supplied to a corresponding one of the plurality of data signal lines via the one of the positive polarity amplifier circuit and the negative polarity amplifier circuit is changed to be supplied to the corresponding one of the plurality of data signal lines via the other of the positive polarity amplifier circuit and the negative polarity amplifier circuit at a timing that polarity of a polar signal is reversed, the polarity of the polar signal being reversed in each given period.

According to the configuration, the data signal supplied to said each of the plurality of data signal lines via the one of the positive polarity amplifier circuit and the negative polarity amplifier circuit is changed to be supplied to said each of the plurality of data signal lines via the other of the positive polarity amplifier circuit and the negative polarity amplifier circuit, in response to the reverse of the polarity of the polar signal.

The display device of the present invention may be configured such that the switching circuit electrically connects the corresponding one of the plurality of data signal lines again to the positive polarity amplifier circuit and the negative polarity amplifier circuit, (i) after the switching circuit electrically disconnects, before the polarity of the polar signal is reversed, the corresponding one of the plurality of data signal lines from the positive polarity amplifier circuit and the negative polarity amplifier circuit and then connects, for the given period, the corresponding one of the plurality of data signal lines to the node which is in the power supply voltage range of the other of the positive polarity amplifier circuit and the negative polarity amplifier circuit, and (ii) after the polarity of the polar signal is reversed.

The configuration makes it possible to prevent a damage of the positive polarity amplifier circuit and the negative polarity amplifier circuit. Therefore, it is possible to provide a display device which consumes less electric power and secures reliability.

The display device of the present invention may be configured to include a display panel which is a liquid crystal display panel.

A liquid crystal display device generally employs a reverse polarity driving for the purpose of avoiding polarization of liquid crystal molecules in a liquid crystal layer, for example. Therefore, the above configuration makes it possible to provide a liquid crystal display device which consumes less electric power and secures reliability.

The present invention is not limited to the description of embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to display devices such as a liquid crystal display device.

REFERENCE SIGNS LIST

1 Liquid crystal display device (display device)
2 Liquid crystal display panel
3 Scanning signal line drive circuit
4 Data signal line drive circuit
5 System-side controller
6 Timing controller
7 Supply voltage generating circuit
8 Common electrode drive circuit
9 DAC circuit
10, 10a Source AMP output circuit
11 Transistor element (Active element)
12 Pixel electrode
13 TFT substrate
14 Counter substrate
15 Positive polarity amplifier circuit
16 Negative polarity amplifier circuit
17, 17a Switching circuit
18 Invertor
S(M) Data signal line
G(N) Scanning signal line

The invention claimed is:

1. A display device, comprising:
 a data signal line drive circuit;
 a plurality of data signal lines connected to the data signal line drive circuit;
 a scanning signal line drive circuit;
 a plurality of scanning signal lines provided in a display area of the display device and connected to the scanning signal line drive circuit so as to intersect the plurality of data signal lines; and
 active elements each of which is electrically connected to a corresponding one of the plurality of data signal lines and a corresponding one of the plurality of scanning signal lines, in the vicinity of an intersection of the corresponding one of the plurality of data signal lines and the corresponding one of the plurality of scanning signal lines,
 said data signal line drive circuit including:
  a positive polarity amplifier circuit provided for each of the plurality of data signal lines;
  a negative polarity amplifier circuit provided for said each of the plurality of data signal lines; and
  a switching circuit provided for said each of the plurality of data signal lines,
 in a case where a data signal supplied to a corresponding one of the plurality of data signal lines via one of the positive polarity amplifier circuit and the negative polarity amplifier circuit is changed to be supplied to the corresponding one of the plurality of data signal lines via the other of the positive polarity amplifier circuit and the negative polarity amplifier circuit, the switching circuit (i) electrically disconnecting the corresponding one of the plurality of data signal lines from the positive polarity amplifier circuit and the negative polarity amplifier circuit and (ii) connecting, for a given period, the corresponding one of the plurality of data signal lines to a node which is in a power supply voltage range of the other of the positive polarity amplifier circuit and the negative polarity amplifier circuit,
 an output of the positive polarity amplifier circuit and an output of the negative polarity amplifier circuit are set so that (i) an absolute value of a highest output value of the positive polarity amplifier circuit and (ii) an absolute value of a lowest output value of the negative polarity amplifier circuit are different from each other, and
 the output of the positive polarity amplifier circuit and the output of the negative polarity amplifier circuit being set so that, at a timing that a signal supplied to a corresponding one of the plurality of scanning signal lines is changed from high to low, the absolute value of the highest output value of the positive polarity amplifier circuit is larger than the absolute value of the lowest output value of the negative polarity amplifier circuit by a change amount of a data signal supplied via a corresponding one of the plurality of data signal lines and a corresponding one of the active elements.

2. The display device as set forth in claim 1, wherein:
 in a case where a polarity of a data signal supplied from the data signal line drive circuit to the corresponding one of the plurality of data signal lines is reversed from positive to negative, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the negative polarity amplifier circuit; and
 in a case where the polarity of the data signal supplied from the data signal line drive circuit to the corresponding one of the plurality of data signal lines is reversed from negative to positive, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the positive polarity amplifier circuit.

3. The display device as set forth in claim 1, wherein the node has a potential level observed when the node is grounded.

4. The display device as set forth in claim 1, wherein:
 (i) an absolute value of a high power supply voltage of the positive polarity amplifier circuit and (ii) an absolute value of a low power supply voltage of the negative polarity amplifier circuit are set so as to be different from each other, according to the highest output value of the positive polarity amplifier circuit and the lowest output value of the negative polarity amplifier circuit.

5. The display device as set forth in claim 1, wherein a low power supply voltage of the positive polarity amplifier circuit and a high power supply voltage of the negative polarity amplifier circuit share a same power supply voltage.

6. The display device as set forth in claim 5, wherein the same power supply voltage has a potential level observed when the same power supply voltage is grounded.

7. The display device as set forth in claim 1, wherein a difference between (i) an absolute value of the high power supply voltage of the positive polarity amplifier circuit and (ii) an absolute value of the low power supply voltage of the negative polarity amplifier circuit is not more than 0.5V.

8. The display device as set forth in claim 1, wherein the data signal supplied to a corresponding one of the plurality of data signal lines via the one of the positive polarity amplifier circuit and the negative polarity amplifier circuit is changed to be supplied to the corresponding one of the plurality of data signal lines via the other of the positive polarity amplifier circuit and the negative polarity amplifier circuit at a timing that polarity of a polar signal is reversed, the polarity of the polar signal being reversed in each given period.

9. The display device as set forth in claim 8, wherein the switching circuit electrically connects the corresponding one of the plurality of data signal lines again to the positive polarity amplifier circuit and the negative polarity amplifier circuit, (i) after the switching circuit electrically disconnects, before the polarity of the polar signal is reversed, the corresponding one of the plurality of data signal lines from the positive polarity amplifier circuit and the negative polarity amplifier circuit and then connects, for the given period, the corresponding one of the plurality of data signal lines to the node which is in the power supply voltage range of the other of the positive polarity amplifier circuit and the negative polarity amplifier circuit, and (ii) after the polarity of the polar signal is reversed.

10. The display device as set forth in claim 1, further comprising a display panel,
 the display panel being a liquid crystal display panel.

11. A display device comprising:
 a data signal line drive circuit;
 a plurality of data signal lines connected to the data signal line drive circuit
 a scanning signal line drive circuit;

a plurality of scanning signal lines provided in a display area of the display device and connected to the scanning signal line drive circuit so as to intersect the plurality of data signal lines; and active elements each of which is electrically connected to a corresponding one of the plurality of data signal lines and a corresponding one of the plurality of scanning signal lines, in the vicinity of an intersection of the corresponding one of the plurality of data signal lines and the corresponding one of the plurality of scanning signal lines, said data signal line drive circuit including:
a positive polarity amplifier circuit provided for each of the plurality of data signal lines; and
a negative polarity amplifier circuit provided for said each of the plurality of data signal lines; and
a switching circuit provided for said each of the plurality of data signal lines, in a case where a data signal supplied to a corresponding one of the plurality of data signal lines via one of the positive polarity amplifier circuit and the negative polarity amplifier circuit is changed to be supplied to the corresponding one of the plurality of data signal lines via the other of the positive polarity amplifier circuit and the negative polarity amplifier circuit, the switching circuit (i) electrically disconnecting the corresponding one of the plurality of data signal lines form the positive polarity amplifier circuit and the negative polarity amplifier circuit and (ii) connecting, for a given period, the corresponding one of the plurality of data signal lines to a node which is in a power supply voltage range of the other of the positive polarity amplifier circuit and the negative polarity amplifier circuit, an output of the positive polarity amplifier circuit and an output of the negative polarity amplifier circuit are set so that (i) an absolute value of a highest output value of the positive polarity amplifier circuit and (ii) an absolute value of a lowest output value of the negative polarity amplifier circuit are different from each other, and an average of the output of the positive polarity amplifier circuit and the output of the negative polarity amplifier circuit being set so as to vary depending on a tone, in an entire output range of the positive polarity amplifier circuit and an entire output range of the negative polarity amplifier circuit, at a timing that a signal supplied to a corresponding one of the plurality of scanning signal lines changes from high to low, and according to a change amount of a data signal supplied via a corresponding one of the plurality of data signal lines and a corresponding one of the active elements which change amount varies depending on a tone.

12. The display device as set forth in claim 11, wherein:
in a case where a polarity of a data signal supplied from the data signal line drive circuit to the corresponding one of the plurality of data signal lines is reversed from positive to negative, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the negative polarity amplifier circuit; and in a case where the polarity of the data signal supplied from the data signal line drive circuit to the corresponding one of the plurality of data signal lines is reversed from negative to positive, the switching circuit electrically disconnects the corresponding one of the plurality of data signal lines from the positive polarity amplifier circuit and the negative polarity amplifier circuit, and then connects, for a given period, the corresponding one of the plurality of data signal lines to a node which is in a power supply voltage range of the positive polarity amplifier circuit.

13. The display device as set forth in claim 11, wherein the node has a potential level observed when the node is grounded.

14. The display device as set forth in claim 11, wherein the output of the positive polarity amplifier circuit and the output of the negative polarity amplifier circuit are set so that the absolute value of the lowest output value of the negative polarity amplifier circuit is larger than the absolute value of the highest output value of the positive polarity amplifier circuit.

15. The display device as set forth in claim 11, wherein:
(i) an absolute value of a high power supply voltage of the positive polarity amplifier circuit and (ii) an absolute value of a low power supply voltage of the negative polarity amplifier circuit are set so as to be different from each other, according to the highest output value of the positive polarity amplifier circuit and the lowest output value of the negative polarity amplifier circuit.

16. The display device as set forth in claim 11, wherein a low power supply voltage of the positive polarity amplifier circuit and a high power supply voltage of the negative polarity amplifier circuit share a same power supply voltage.

17. The display device as set forth in claim 16, wherein the same power supply voltage has a potential level observed when the same power supply voltage is grounded.

18. The display device as set forth in claim 11, wherein a difference between (i) an absolute value of the high power supply voltage of the positive polarity amplifier circuit and (ii) an absolute value of the low power supply voltage of the negative polarity amplifier circuit is not more than 0.5V.

19. The display device as set forth in claim 11, wherein the data signal supplied to a corresponding one of the plurality of data signal lines via the one of the positive polarity amplifier circuit and the negative polarity amplifier circuit is changed to be supplied to the corresponding one of the plurality of data signal lines via the other of the positive polarity amplifier circuit and the negative polarity amplifier circuit at a timing that polarity of a polar signal is reversed, the polarity of the polar signal being reversed in each given period.

20. The display device as set forth in claim 19, wherein the switching circuit electrically connects the corresponding one of the plurality of data signal lines again to the positive polarity amplifier circuit and the negative polarity amplifier circuit, (i) after the switching circuit electrically disconnects, before the polarity of the polar signal is reversed, the corresponding one of the plurality of data signal lines from the positive polarity amplifier circuit and the negative polarity amplifier circuit and then connects, for the given period, the corresponding one of the plurality of data signal lines to the node which is in the power supply voltage range of the other of the positive polarity amplifier circuit and the negative polarity amplifier circuit, and (ii) after the polarity of the polar signal is reversed.

* * * * *